(12) United States Patent
Sato

(10) Patent No.: US 11,120,607 B2
(45) Date of Patent: Sep. 14, 2021

(54) INFORMATION GENERATING APPARATUS, INFORMATION PROCESSING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Tomokazu Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/860,550

(22) Filed: Apr. 28, 2020

(65) Prior Publication Data

US 2020/0258286 A1    Aug. 13, 2020

Related U.S. Application Data

(63) Continuation of application No. PCT/JP2018/032298, filed on Aug. 31, 2018.

(30) Foreign Application Priority Data

Nov. 2, 2017 (JP) .............................. JP2017-213225

(51) Int. Cl.
*G06T 15/00* (2011.01)
*G06T 15/04* (2011.01)

(52) U.S. Cl.
CPC ............ *G06T 15/04* (2013.01); *G06T 15/005* (2013.01)

(58) Field of Classification Search
CPC .............................. G06T 15/04; G06T 15/005
See application file for complete search history.

(56) References Cited

U.S. PATENT DOCUMENTS 6,483,521 B1 * 11/2002 Takahashi ............... G06T 15/04
345/582
6,717,577 B1    4/2004 Cheng
(Continued)

FOREIGN PATENT DOCUMENTS

| JP | 2001195603 A | 7/2001 |
| JP | 2012014744 A | 1/2012 |
| JP | 2015512072 A | 4/2015 |

OTHER PUBLICATIONS

International Search Report issued in Intl. Appln. No. PCT/JP2018/032298 dated Nov. 20, 2018. English ranslation provided.

(Continued)

*Primary Examiner* — Charles Tseng
(74) *Attorney, Agent, or Firm* — Rossi, Kimms & McDowell LLP

(57) ABSTRACT

An information generating apparatus generates a 3D model expressing a three-dimensional object by using shape data indicating a shape of an object and texture data representing a texture to be assigned to a surface of the shape and containing first information describing a first constituent element contained in the shape data, second information describing a combination of the first constituent element and a second constituent element of the texture assigned in association with the first constituent element, third information describing, by using a value indicating the combination, a shape of each face of the three-dimensional object and a texture to be assigned, and fourth information describing a second constituent element contained in the texture data. The third information describes at least the first constituent element by using a value different from a coordinate value of a vertex of the shape.

18 Claims, 20 Drawing Sheets

(56) References Cited

U.S. PATENT DOCUMENTS 9,979,948 B2 5/2018 Jiang
2013/0278598 A1* 10/2013 Sakurai .................. G06T 15/04
345/419

OTHER PUBLICATIONS

Written Opinion issued in Intl. Appln. No. PCT/JP2018/032298 dated Nov. 20, 2018.

* cited by examiner

FIG. 2A

| MESH VERTEX NUMBER | MESH VERTEX COORDINATE |
|---|---|
| V0 | XYZ0 |
| V1 | XYZ1 |
| V2 | XYZ2 |
| V3 | XYZ3 |
| V4 | XYZ4 |
| V5 | XYZ5 |
| V6 | XYZ6 |
| V7 | XYZ7 |

FIG. 2B

| POLYGON NUMBER | POLYGON INFORMATION |
|---|---|
| F0 | V0 V1 V4 V5 |
| F1 | V1 V2 V3 V4 |
| F2 | V0 V5 V6 V7 |
| F3 | V5 V4 V3 V6 |
| F4 | V0 V7 V2 V1 |
| F5 | V7 V6 V3 V2 |

FIG. 3A

| MESH VERTEX NUMBER | MESH VERTEX COORDINATE |
|---|---|
| V0 | XYZ0 |
| V1 | XYZ1 |
| V2 | XYZ2 |
| V3 | XYZ3 |
| V4 | XYZ4 |
| V5 | XYZ5 |
| V6 | XYZ6 |
| V7 | XYZ7 |

FIG. 3B

| TEXTURE VERTEX NUMBER | TEXTURE VERTEX COORDINATE |
|---|---|
| C0 | UV0 |
| C1 | UV1 |
| C2 | UV2 |
| C3 | UV3 |
| C4 | UV4 |
| C5 | UV5 |
| C6 | UV6 |
| C7 | UV7 |
| C8 | UV8 |
| C9 | UV9 |
| C10 | UV10 |
| C11 | UV11 |

FIG. 3C

| POLYGON NUMBER | POLYGON INFORMATION | |
|---|---|---|
| | MESH VERTEX NUMBER LIST | TEXTURE VERTEX NUMBER LIST |
| F0 | V0 V1 V4 V5 | C0 C1 C4 C5 |
| F1 | V1 V2 V3 V4 | C1 C2 C3 C4 |
| F2 | V0 V5 V6 V7 | C6 C7 C10 C11 |
| F3 | V5 V4 V3 V6 | C7 C8 C9 C10 |
| F4 | V0 V7 V2 V1 | C0 C1 C4 C5 |
| F5 | V7 V6 V3 V2 | C1 C2 C3 C4 |

FIG. 4A

| MESH VERTEX NUMBER | MESH VERTEX COORDINATE | TEXTURE VERTEX COORDINATE |
|---|---|---|
| V0 | XYZ0 | UV0 |
| V1 | XYZ1 | UV1 |
| V2 | XYZ2 | UV2 |
| V3 | XYZ3 | UV3 |
| V4 | XYZ4 | UV4 |
| V5 | XYZ5 | UV5 |
| V6 | XYZ0 | UV6 |
| V7 | XYZ5 | UV7 |
| V8 | XYZ4 | UV8 |
| V9 | XYZ3 | UV9 |
| V10 | XYZ6 | UV10 |
| V11 | XYZ7 | UV11 |
| V12 | XYZ0 | UV0 |
| V13 | XYZ7 | UV1 |
| V14 | XYZ6 | UV2 |
| V15 | XYZ3 | UV3 |
| V16 | XYZ2 | UV4 |
| V17 | XYZ1 | UV5 |

FIG. 4B

| POLYGON NUMBER | POLYGON INFORMATION |
|---|---|
| F0 | V0 V1 V4 V5 |
| F1 | V1 V2 V3 V4 |
| F2 | V6 V7 V10 V11 |
| F3 | V7 V8 V9 V10 |
| F4 | V12 V13 V16 V17 |
| F5 | V13 V14 V15 V16 |

FIG. 5A

| COMBINATION NUMBER | COMBINATION INFORMATION | |
|---|---|---|
| P0 | V0 | C0 |
| P1 | V1 | C1 |
| P2 | V2 | C2 |
| P3 | V3 | C3 |
| P4 | V4 | C4 |
| P5 | V5 | C5 |
| P6 | V0 | C6 |
| P7 | V5 | C7 |
| P8 | V4 | C8 |
| P9 | V3 | C9 |
| P10 | V6 | C10 |
| P11 | V7 | C11 |
| P12 | V7 | C1 |
| P13 | V6 | C2 |
| P14 | V2 | C4 |
| P15 | V1 | C5 |

FIG. 5B

| POLYGON NUMBER | POLYGON INFORMATION |
|---|---|
| F0 | P0 P1 P4 P5 |
| F1 | P1 P2 P3 P4 |
| F2 | P6 P7 P10 P11 |
| F3 | P7 P8 P9 P10 |
| F4 | P0 P12 P14 P15 |
| F5 | P12 P13 P3 P14 |

FIG. 6A

| HEADER | COMBINATION INFORMATION | MESH VERTEX COORDINATE | TEXTURE VERTEX COORDINATE | POLYGON INFORMATION |

FIG. 6B

| HEADER | TEXTURE IMAGE LINK | NUMBER OF COMBINATION INFORMATION ELEMENTS | NUMBER OF MESH VERTICES | NUMBER OF TEXTURE VERTICES | NUMBER OF POLYGONS |

FIG. 6C

| COMBINATION INFORMATION | V0 | V1 | ... | V2 | V1 | C0 | C1 | ... | C4 | C5 |

FIG. 6D

| MESH VERTEX COORDINATE | XYZ0 | XYZ1 | ... |

FIG. 6E

| TEXTURE VERTEX COORDINATE | UV0 | UV1 | ... |

FIG. 6F

| POLYGON INFORMATION | P0 P1 P4 P5 | P1 P2 P3 P4 | ... |

FIG. 11

| COMBINATION NUMBER | COMBINATION INFORMATION | |
|---|---|---|
| P0 | V0 | UV0 |
| P1 | V1 | UV1 |
| P2 | V2 | UV2 |
| P3 | V3 | UV3 |
| P4 | V4 | UV4 |
| P5 | V5 | UV5 |
| P6 | V0 | UV6 |
| P7 | V5 | UV7 |
| P8 | V4 | UV8 |
| P9 | V3 | UV9 |
| P10 | V6 | UV10 |
| P11 | V7 | UV11 |
| P12 | V7 | UV12 |
| P13 | V6 | UV13 |
| P14 | V2 | UV14 |
| P15 | V1 | UV15 |

FIG. 13

| COMBINATION NUMBER | COMBINATION INFORMATION | |
|---|---|---|
| P0 | ———— | ———— |
| P1 | ———— | ———— |
| P2 | ———— | ———— |
| P3 | ———— | ———— |
| P4 | ———— | ———— |
| P5 | ———— | ———— |
| P6 | V0 | ———— |
| P7 | V5 | ———— |
| P8 | V4 | ———— |
| P9 | V3 | ———— |
| P10 | V6 | ———— |
| P11 | V7 | ———— |
| P12 | V7 | C1 |
| P13 | V6 | C2 |
| P14 | V2 | C4 |
| P15 | V1 | C5 |
| BLOCK COPY SIZE | 6 | 12 |

FIG. 14A

| HEADER | COMBINATION INFORMATION | MESH VERTEX COORDINATE | TEXTURE VERTEX COORDINATE | POLYGON INFORMATION |

FIG. 14B

HEADER

| TEXTURE IMAGE LINK | BLOCK COPY SIZE | NUMBER OF COMBINATION INFORMATION ELEMENTS | NUMBER OF MESH VERTICES | NUMBER OF TEXTURE VERTICES | NUMBER OF POLYGONS |

FIG. 14C

COMBINATION INFORMATION

| V0 | V5 | ... | V2 | V1 | C1 | C2 | C4 | C5 |

FIG. 14D

MESH VERTEX COORDINATE

| XYZ0 | XYZ1 | ... |

FIG. 14E

TEXTURE VERTEX COORDINATE

| UV0 | UV1 | ... |

FIG. 14F

POLYGON INFORMATION

| P0 P1 P4 P5 | P1 P2 P3 P4 | ... |

FIG. 16A

| MESH VERTEX NUMBER | MESH VERTEX COORDINATE |
|---|---|
| V0 | XYZ0 |
| V1 | XYZ1 |
| V2 | XYZ2 |
| V3 | XYZ3 |
| V4 | XYZ4 |
| V5 | XYZ5 |
| V6 | XYZ6 |
| V7 | XYZ7 |

FIG. 16B

| MESH EDGE NUMBER | MESH EDGE |
|---|---|
| VE0 | V0 V1 |
| VE1 | V0 V5 |
| VE2 | V0 V7 |
| VE3 | V1 V2 |
| VE4 | V1 V4 |
| VE5 | V2 V3 |
| VE6 | V2 V7 |
| VE7 | V3 V4 |
| VE8 | V3 V6 |
| VE9 | V4 V5 |
| VE10 | V5 V6 |
| VE11 | V6 V7 |

FIG. 16C

| TEXTURE VERTEX NUMBER | TEXTURE VERTEX COORDINATE |
|---|---|
| C0 | UV0 |
| C1 | UV1 |
| C2 | UV2 |
| C3 | UV3 |
| C4 | UV4 |
| C5 | UV5 |
| C6 | UV6 |
| C7 | UV7 |
| C8 | UV8 |
| C9 | UV9 |
| C10 | UV10 |
| C11 | UV11 |

FIG. 16D

| TEXTURE EDGE NUMBER | TEXTURE EDGE |
|---|---|
| CE0 | C0 C1 |
| CE1 | C0 C5 |
| CE2 | C1 C2 |
| CE3 | C1 C4 |
| CE4 | C2 C3 |
| CE5 | C3 C4 |
| CE6 | C4 C5 |
| CE7 | C6 C7 |
| CE8 | C6 C11 |
| CE9 | C7 C8 |
| CE10 | C7 C10 |
| CE11 | C8 C9 |
| CE12 | C9 C10 |
| CE13 | C10 C11 |

FIG. 16E

| COMBINATION NUMBER | COMBINATION INFORMATION | |
|---|---|---|
| P0 | VE0 | CE0 |
| P1 | VE4 | CE3 |
| P2 | VE9 | CE6 |
| P3 | VE1 | CE1 |
| P4 | VE3 | CE2 |
| P5 | VE5 | CE4 |
| P6 | VE7 | CE5 |
| P7 | VE1 | CE7 |
| P8 | VE10 | CE10 |
| P9 | VE11 | CE13 |
| P10 | VE2 | CE8 |
| P11 | VE9 | CE9 |
| P12 | VE7 | CE11 |
| P13 | VE8 | CE12 |
| P14 | VE2 | CE0 |
| P15 | VE6 | CE3 |
| P16 | VE3 | CE6 |
| P17 | VE0 | CE1 |
| P18 | VE11 | CE2 |
| P19 | VE8 | CE4 |
| P20 | VE5 | CE5 |

FIG. 16F

| POLYGON NUMBER | POLYGON INFORMATION |
|---|---|
| F0 | P0 P1 P2 P3 |
| F1 | P4 P5 P6 P1 |
| F2 | P7 P8 P9 P10 |
| F3 | P11 P12 P13 P8 |
| F4 | P14 P15 P16 P17 |
| F5 | P18 P19 P20 P15 |

INFORMATION GENERATING APPARATUS, INFORMATION PROCESSING APPARATUS, CONTROL METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2018/032298, filed Aug. 31, 2018, which claims the benefit of Japanese Patent Application No. 2017-213225, filed Nov. 2, 2017, both of which are hereby incorporated by reference herein in their entirety.

BACKGROUND

Field

The present disclosure relates to an information generating apparatus, an information processing apparatus, a control method, and a non-transitory computer-readable storage medium, and more specifically, to a method of describing three-dimensional object data.

Background Art

A method of describing object surfaces in the form of a textured mesh is available as one of three-dimensional object expressing methods. The mesh is expressed as, for example, a set of polygons on a three-dimensional space. PTL 1 describes a method of describing texture vertex coordinates (UV) on an image corresponding to three-dimensional mesh vertex coordinates (XYZ) in one-to-one correspondence with each other, thereby associating the structure of an object with a texture image representing the way the mesh looks. Note that each polygon is defined by designating the numbers of mesh vertices forming the polygon.

The conventional technique still has room for improvement, for example, data expressing a three-dimensional object is redundant, and the efficiency of a process of loading data to a memory is insufficient.

CITATION LIST

Patent Literature

PTL 1: Japanese Patent Laid Open No. 2001-195603

SUMMARY

The present disclosure provides a method of efficiently expressing a three-dimensional object.

According to one aspect of the present disclosure, there is provided n information generating apparatus for generating a 3D model that expresses a three-dimensional object by using shape data indicating a shape of an object and texture data representing a texture to be assigned to a surface of the shape, comprising: one or more processors; and one or more memories that stores a computer-readable instruction for causing, when executed by the one or more processors, the information generating apparatus to: generate the 3D model containing first information describing a first constituent element contained in the shape data, second information describing a combination of the first constituent element and a second constituent element of the texture assigned in association with the first constituent element, third information describing, by using a value indicating the combination, a shape of each face of the three-dimensional object and a texture to be assigned, and fourth information describing a second constituent element contained in the texture data; and output the 3D model, wherein in the third information, at least the first constituent element is described by using a value different from a coordinate value of a vertex of the shape.

According to another aspect of the present disclosure, there is provided an information processing apparatus for rendering a three-dimensional object by obtaining a 3D model that expresses the three-dimensional object by using shape data indicating a shape of an object and texture data representing a texture to be assigned to a surface of the shape, comprising: one or more processors; and one or more memories that stores a computer-readable instruction for causing, when executed by the one or more processors, the information processing apparatus to: obtain the 3D model containing first information describing a first constituent element contained in the shape data, second information describing a combination of the first constituent element and a second constituent element of the texture assigned in association with the first constituent element, third information describing, by using a value indicating the combination, a shape of each face of the three-dimensional object and a texture to be assigned, and fourth information describing a second constituent element contained in the texture data; specify a combination of the first constituent element and the second constituent element based on the first information, the second information, and the fourth information; and render the three-dimensional object based on the specified constituent element combination and the third information, wherein in the third information, at least the first constituent element is described by a value different from a coordinate value of a vertex of the shape.

Further features of the present disclosure will become apparent from the following description of exemplary embodiments with reference to the attached drawings.

BRIEF DESCRIPTION OF THE DRAWINGS

FIG. 2A is a view showing an outline of a mesh describing method.

FIG. 2B is a view showing an outline of a mesh describing method.

FIG. 3A is a view showing an outline of a method of describing mesh vertices and texture vertices in association with each other.

FIG. 3B is a view showing an outline of a method of describing mesh vertices and texture vertices in association with each other.

FIG. 3C is a view showing an outline of a method of describing mesh vertices and texture vertices in association with each other.

FIG. 4A is a view showing an outline of a method of describing mesh vertices and texture vertices in association with each other.

FIG. 4B is a view showing an outline of a method of describing mesh vertices and texture vertices in association with each other.

FIG. 5A is a view showing the first example of a method of describing mesh vertices and texture vertices in association with each other.

FIG. 5B is a view showing the first example of the method of describing mesh vertices and texture vertices in association with each other.

FIG. 6A is a view showing the first arrangement example of a file describing a data structure according to an embodiment.

FIG. 6B is a view showing the first arrangement example of the file describing the data structure according to the embodiment.

FIG. 6C is a view showing the first arrangement example of the file describing the data structure according to the embodiment.

FIG. 6D is a view showing the first arrangement example of the file describing the data structure according to the embodiment.

FIG. 6E is a view showing the first arrangement example of the file describing the data structure according to the embodiment.

FIG. 6F is a view showing the first arrangement example of the file describing the data structure according to the embodiment.

FIG. 11 is a view showing the second example of the method of describing mesh vertices and texture vertices in association with each other.

FIG. 13 is a view showing the third example of the method of describing mesh vertices and texture vertices in association with each other.

FIG. 14A is a view showing the third arrangement example of the file describing the data structure according to the embodiment.

FIG. 14B is a view showing the third arrangement example of the file describing the data structure according to the embodiment.

FIG. 14C is a view showing the third arrangement example of the file describing the data structure according to the embodiment.

FIG. 14D is a view showing the third arrangement example of the file describing the data structure according to the embodiment.

FIG. 14E is a view showing the third arrangement example of the file describing the data structure according to the embodiment.

FIG. 14F is a view showing the third arrangement example of the file describing the data structure according to the embodiment.

FIG. 16A is a view showing an example of a method of describing mesh edges and texture edges in association with each other.

FIG. 16B is a view showing an example of the method of describing mesh edges and texture edges in association with each other.

FIG. 16C is a view showing an example of the method of describing mesh edges and texture edges in association with each other.

FIG. 16D is a view showing an example of the method of describing mesh edges and texture edges in association with each other.

FIG. 16E is a view showing an example of the method of describing mesh edges and texture edges in association with each other.

FIG. 16F is a view showing an example of the method of describing mesh edges and texture edges in association with each other.

DESCRIPTION OF THE EMBODIMENTS

Embodiments of the present disclosure will be explained below with reference to the accompanying drawings.

First Embodiment

A method according to this embodiment relates to a technique of constructing a data structure having a reduced data amount in a textured three-dimensional (3D) polygon model. First, a conventional data structure and an example data structure according to this embodiment will be explained. After that, the arrangements and processing methods of an information providing apparatus for generating data and an information processing apparatus for forming a three-dimensional image by using the data according to this embodiment will be explained. Note that the apparatus arrangements and the procedures of the methods to be explained below are merely examples, so various modifications and changes can be made.

Conventional 3D Model Describing Method

Figure 1A:
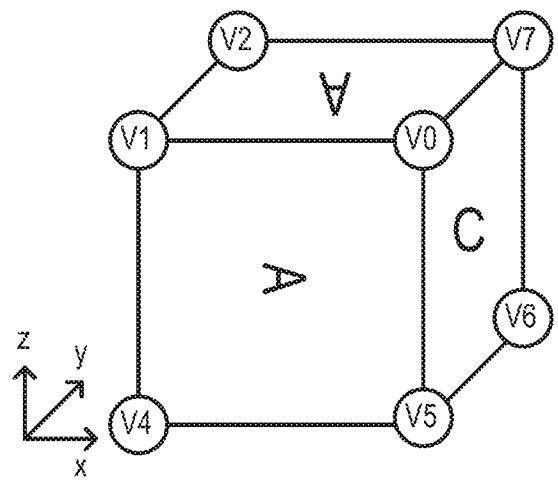
FIG. 1A is a view showing examples of the mesh vertices and texture vertices of a 3D model formed by polygons.
Figure 1B:
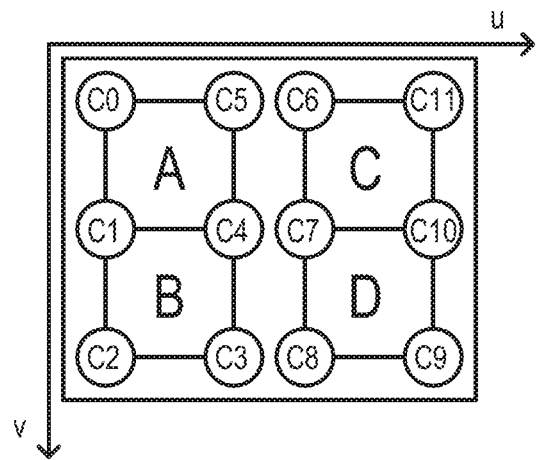
FIG. 1B is a view showing examples of the mesh vertices and texture vertices of a 3D model formed by polygons.
Figure 1C:
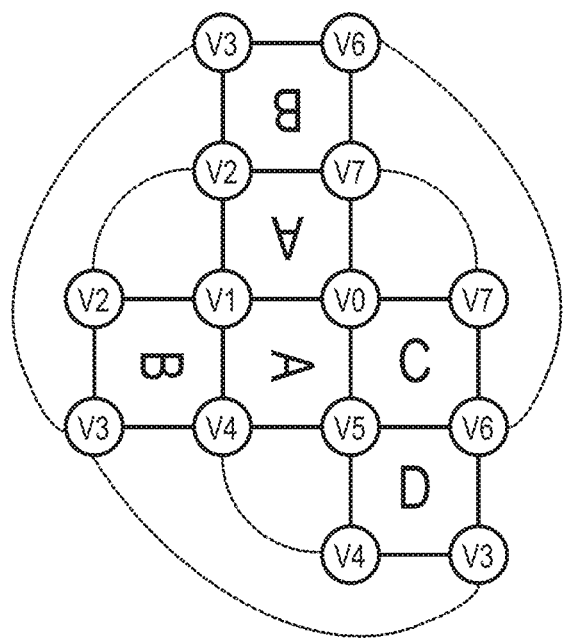
FIG. 1C is a view showing examples of the mesh vertices and texture vertices of a 3D model formed by polygons.

A conventional textured 3D model describing method will be explained with reference to FIGS. 1A to 1C. FIG. 1A shows an example of a 3D model of a cube viewed in a given direction. In this example, textures in which alphabets ("A" and "C") are rendered are added to a mesh formed by square polygons. Note that in this example, values "V0" to "V7" are attached to the mesh vertices at the corners of the cube as identification information for identifying the mesh vertices, for the sake of explanation. FIG. 1B represents a texture image of the 3D model. In FIG. 1B, positions corresponding to the mesh vertices are represented as texture vertices, and numbers C0 to C11 indicating the texture vertices are attached for the sake of explanation. FIG. 1C is an example of an developed view in which the cube shown in FIG. 1A is developed into a plane. FIG. 1C uses a development by which when one vertex is represented as a plurality of points by expansion, the plurality of points are connected by broken lines. Note that FIG. 1A shows an example in which a 3D model is expressed by square polygons, but the present disclosure is not limited to this, and it is also possible to express a 3D model by generally used triangular polygons.

First, a general method of expressing nontextured shape data will be explained with reference to FIGS. 2A and 2B. In FIG. 2A, the vertices of a mesh are described by XYZ0 to XYZ7 as coordinate values on a three-dimensional space having X, Y, and Z axes. Note that XYZk (k=0 to 7) is three-dimensional vector data such as (xk, yk, zk). Since the mesh vertex numbers (V0 to V7) are implicitly defined by the arrangement of coordinates (that is, the (j+1)th mesh vertex number is specified as Vj), they need not be described as data. In FIG. 2B, mesh vertex numbers forming each polygon are described. Like the mesh vertex numbers shown in FIG. 2A, polygon numbers are implicitly defined by the arrangement of coordinates and hence need not be described as data. The position and shape of each polygon are defined by thus describing coordinate values corresponding to each mesh vertex as shown in FIG. 2A, and mesh vertex numbers forming the polygon as shown in FIG. 2B.

A method of giving polygon information the correspondence between a texture image and a mesh will be explained below with reference to FIGS. 3A to 3C. FIG. 3A shows information of mesh vertices similar to FIG. 2A. In FIG. 3B, the vertices of textures are described by UV0 to UV11 as coordinate values in an image space like that shown in FIG. 1B. Note that UVk (k=0 to 11) is two-dimensional vector data such as (uk, vk). Texture vertex numbers (C0 to C11) are implicitly defined by the arrangement of coordinates and hence need not be described as data, like the mesh vertex numbers shown in FIGS. 2A and 3A. In FIG. 3C, texture vertex numbers associated with the mesh vertex numbers of each polygon are described. In an example of polygon number F3 shown in FIG. 3C, mesh vertices V5, V4, V3, and V6 are respectively associated with texture vertices C7, C8, C9, and C10. Note that the polygon number is also implicitly defined by the arrangement of coordinates and hence need not be described as data. The description method of adding texture information (texture vertex information) corresponding to a polygon as shown in FIGS. 3A to 3C facilitates an information describing process and has a high degree of freedom. Therefore, many 3D model file formats such as OBJ, PLY, and VRML adopt this description method.

As another 3D model expression method, a method of expressing a 3D model by adding texture association information directly to a mesh vertex will be explained below with reference to FIGS. 4A and 4B. In FIG. 3C, texture vertices C5 (polygon number F0) and C7 (polygon numbers F2 and F3) are associated with mesh vertex V5. That is, the plurality of texture vertex coordinates UV5 and UV7 are associated with mesh vertex coordinate XYZ5. Thus, the correspondence between the mesh vertex and the texture vertex is not a one-to-one correspondence in some cases. In this method, therefore, as shown in FIG. 4A, information of a mesh vertex corresponding to a plurality of texture vertices is described a plurality of times for each corresponding texture vertex, in order to form mesh vertex information by which one texture vertex coordinate is associated with one mesh vertex coordinate. That is, mesh vertex information V5 that associates texture vertex coordinate UV5 with mesh vertex coordinate XYZ5, and mesh vertex information V7 that associates texture vertex coordinate UV7 with mesh vertex coordinate XYZ5, are independently described. Note that the mesh vertex numbers are reassigned in this description, so the mesh vertex numbers shown in FIG. 4A do not correspond to the mesh vertex numbers in the model shown in FIG. 1A. In this method as shown in FIG. 4B, the mesh vertex numbers forming each polygon are described by using the mesh vertex numbers defined in FIG. 4A. This data expression method is adopted in, for example, the PMD file format and PTL 1.

Rendering of a 3D model is in many cases performed by loading data into the form as shown in FIGS. 4A and 4B, transferring the data to a GPU (Graphics Processing Unit), and executing processing. As a method of converting the data format as shown in FIGS. 3A to 3C into the data format shown in FIGS. 4A and 4B, there is a method of sequentially writing coordinate information on a memory in accordance with numbers shown in a mesh vertex number list and a texture vertex number list. For example, information of a combination of mesh vertex number V0 and texture vertex number C0 is obtained by referring to polygon information for polygon number F0 described in FIG. 3C. For this combination, information of a combination of the mesh vertex coordinate and the texture vertex coordinate is output to a memory by referring to FIGS. 3A and 3B. Likewise, information of a combination of the mesh vertex coordinate and the texture vertex coordinate is output for each of a combination of mesh vertex number V1 and texture vertex number C1, a combination of mesh vertex number V4 and texture vertex number C4, and a combination of mesh vertex number V5 and texture vertex number C5. After that, the same processing is executed on polygon numbers F1 to F5, thereby converting the data format as shown in FIGS. 3A to 3C into the data format shown in FIGS. 4A and 4B. In this conversion, however, the same combination of the mesh vertex number and the texture vertex number is described a plurality of times in some cases. For example, mesh vertex number V5 and texture vertex number C7 are associated with each other for polygon numbers F2 and F3, so information of the combination of V5 and C7 is described twice accordingly. Consequently, the number of vertices becomes larger than the original number, and this may increase the load on data transfer or the rendering process. Also, if conversion is performed by taking account of duplication so as not to increase the number of vertices, the time required for the conversion process may prolong.

On the other hand, the description method as shown in FIGS. 4A and 4B is suitable for rendering but may be redundant as data expression because repetitive description of the same coordinate information is necessary. For example, to obtain a one-to-one correspondence between the mesh vertex coordinate and the texture vertex coordinate, mesh vertex coordinate XYZ0 of mesh vertex number V0 in the model shown in FIG. 1A is repetitively described in mesh vertex numbers V0, V6, and V12 shown in FIG. 4A. The same phenomenon can occur for other vertices.

First Description Example of 3D Model According to Embodiment

This embodiment uses a reference table defining mesh vertex-texture vertex combination information. First, the data structure of a 3D model will be explained below by taking the 3D model shown in FIG. 1A explained earlier as an example. FIGS. 5A and 5B respectively show a reference table defining mesh vertex-texture vertex combination information and information expressing a polygon by using the reference table according to this embodiment. Note that the data structure according to this embodiment contains vertex coordinate information of mesh vertices and texture vertices as shown in FIGS. 3A and 3B in addition to the information shown in FIGS. 5A and 5B, but the vertex coordinate information is not shown in order to simplify the explanation. The reference table shown in FIG. 5A describes information of all combinations of mesh vertices and texture vertices existing in the 3D model shown in FIG. 1A. Since FIG. 5A describes what combinations exist, the same mesh vertex-texture vertex combination information is not described a plurality of times. Note that in FIG. 5A, a corresponding combination number Pk (k=0 to 15) is attached to each mesh vertex-texture vertex combination, but this information is implicitly defined by the arrangement of coordinates and hence need not be described as data. In this embodiment as shown in FIG. 5B, each polygon is described by the combination number defined in FIG. 5A. That is, each polygon information indirectly specifies the mesh vertex coordinate and the texture vertex coordinate by designating the combination number.

FIGS. 6A to 6F show a file example so generated as to contain FIGS. 3A and 3B and FIGS. 5A and 5B. FIG. 6A shows an arrangement example of the whole file, and FIGS. 6B to 6F show description examples of practical data of individual elements. In this example, the file shown in FIG. 6A contains a header, combination information, a mesh vertex coordinate, a texture vertex coordinate, and polygon information. As shown in FIG. 6B, a texture image link indicating the path to a file of texture information can be described in the header region of the file. In addition, pieces of information indicating the number of elements, the number of mesh vertices, the number of texture vertices, and the number of polygons of the combination information shown in FIG. 5A are described in the header region. These pieces of number information can be used to discriminate the boundary between the combination information and the mesh vertex coordinate, the boundary between the mesh vertex coordinate and the texture vertex coordinate, and the boundary between the texture vertex coordinate and the polygon information in the file shown in FIG. 6A. Note that the information description order in the header region is not limited to this, and a region where each data is described can be set in accordance with an arbitrary rule interpretable by an information processing apparatus having obtained this file. It is also possible to describe data other than the contents shown in FIG. 6B in the header region.

In an example as shown in FIG. 6C, in the combination information region, texture vertex numbers are sequentially described after all mesh vertex numbers are described in the order of the combination information shown in FIG. 5A. However, the present disclosure is not limited to this, and data can be described in accordance with an arbitrary rule interpretable by an information processing apparatus having obtained this file. For example, the description order of the mesh vertex numbers and the texture vertex numbers may also be reversed. It is also possible to alternately describe the mesh vertex number and the texture vertex number, for example, it is possible to describe a mesh vertex number and a corresponding texture vertex number after that, and then describe a next mesh vertex number and a corresponding texture vertex number. In an example as shown in FIG. 6D, all the mesh vertex coordinates are described in the order shown in FIG. 3A in the mesh vertex coordinate region. In an example as shown in FIG. 6E, all the texture vertex coordinates are sequentially described in the order shown in FIG. 3B in the texture vertex coordinate region. Note that the description orders of the mesh vertex coordinates and the texture vertex coordinates need not comply with the orders shown in FIGS. 3A and 3B, and data can be described in an order complying with an arbitrary rule interpretable by an information processing apparatus having obtained this file.

Note that each region described above can be divided into two or more regions, and a plurality of regions can be integrated into one region. Note also that each data can be compressed (coded) by a predetermined compression method. In this case, the start position or length information of each data can be described in the header in order to facilitate accessing the data. Furthermore, data other than the above-described data can also be described in the file, and, for example, if a part or the whole of data can be specified or estimated from another data, this specifiable or estimable data need not be described in the file. In this embodiment, the example in which a file storing texture image data independently exists and location information of the file is described has been explained. However, the texture image data itself may also be contained in this file.

The data structure like this can reduce the redundancy of data because no duplicated combination information is described. In addition, each vertex coordinate information is also described only once, and this can also reduce the data amount. Furthermore, the above-described data format is suitable for rendering like FIGS. 4A and 4B, so the processing efficiency can sufficiently be increased as well.

Apparatus Arrangement

Next, the arrangement of an information generating apparatus for generating a file related to the data structure as described above and an information processing apparatus for rendering a three-dimensional object by obtaining the file will be explained.

Figure 7:
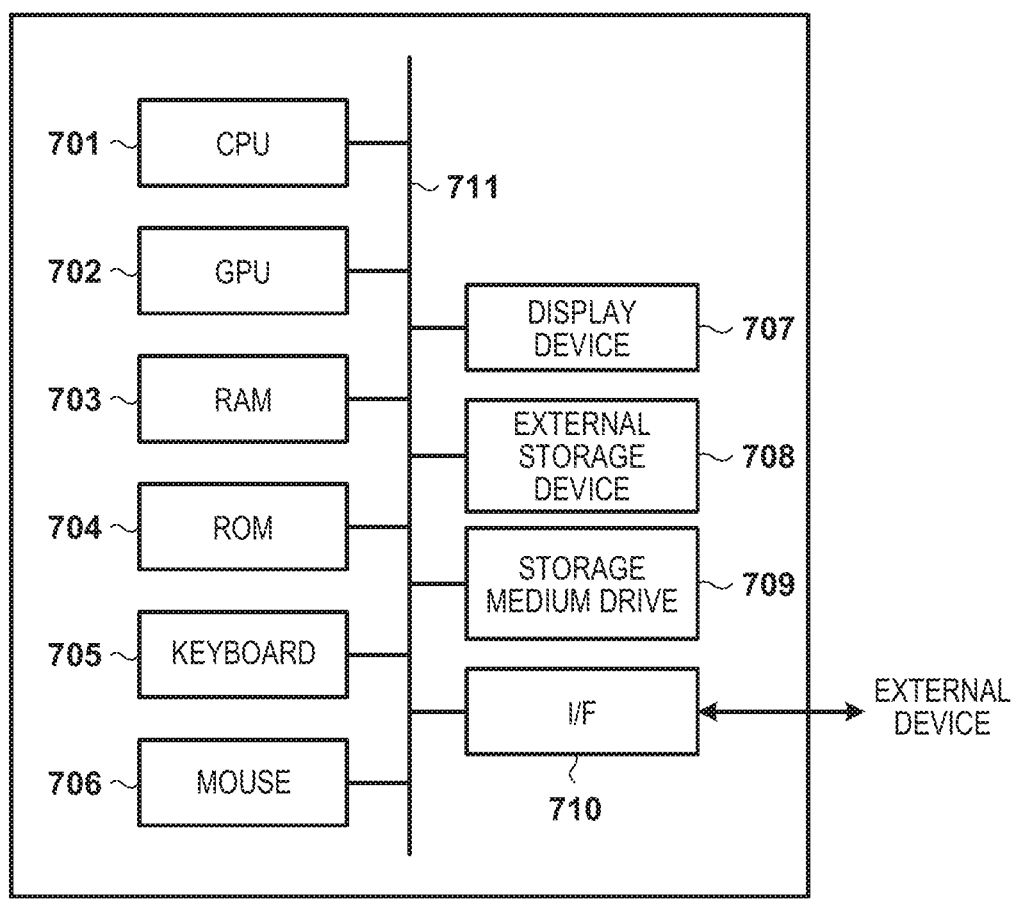
FIG. 7 is a view showing a hardware arrangement example of an information generating apparatus and an information processing apparatus.

FIG. 7 is a view showing a hardware arrangement example of the image generating apparatus and the image processing apparatus. The information generating apparatus and the information processing apparatus can be general computers. These apparatuses include, for example, a CPU 701, a GPU 702, a RAM 703, a ROM 704, a keyboard 705, a mouse 706, a display device 707, an external storage device 708, a storage medium driver 709, and an I/F 710. Note that these components are connected to be able to communicate with each other via an internal bus 711.

The CPU 701 controls the whole computer and executes various processes to be performed by the information generating apparatus and the information processing apparatus (to be described later) by using computer programs and data stored in the RAM 703 and the ROM 704. The GPU 702 executes a process of, for example, rendering an image by accepting 3D model information and a rendering instruction from the CPU 701, and causing the display device 707 to display the rendered image.

The RAM 703 is an example of a computer-readable storage medium. The RAM 703 has a storage area for temporarily storing computer programs and data loaded from, for example, the external storage device 708, the storage medium driver 709, and the I/F 710. Also, the RAM 703 provides a work area to be used by the CPU 701 when executing various processes. That is, the RAM 703 has a storage area that can be provided as needed in order to hold various kinds of data. The ROM 704 is an example of a computer-readable storage medium, and stores computer setting data, a boot program, and the like.

The keyboard 705 and the mouse 706 are devices for accepting operations by the user of the computer, and input the contents of the accepted operations to the CPU 701. Note that the keyboard 705 and the mouse 706 are examples of the operation-accepting device and can be replaced with various operation-accepting devices such as a touch panel and a voice input mechanism. The display device 707 is a CRT, a liquid crystal screen, or the like, and displays the result of processing by the CPU 701 by using images and characters. Note that the display device 707 can also have an operation-accepting function such as a touch display. Note also that the display device 707 need not be incorporated into the information generating apparatus and the information processing apparatus, and can be a device that is prepared independently of these apparatuses and connectable to these apparatuses via a cable or the like. In this case, the information generating apparatus and the information processing apparatus can incorporate a display control device or the like.

The external storage device 708 is an example of a computer-readable storage medium, and is a large-capacity information storage device such as a hard disk drive. The external storage device 708 can store, for example, an OS (Operating System), computer programs and data to be executed by the CPU 701 in order to implement various processes (to be described later), the above-described various tables, and a database. For example, the computer programs and data to be stored in the external storage device 708 are loaded into the RAM 703 under the control of the CPU 701, and processed by the CPU 701. The storage medium 709 reads out computer programs and data stored in a storage medium such as a CD-ROM or a DVD-ROM, and outputs the readout computer programs and data to the external storage device 708 and the RAM 703. For example, it is possible to cause a storage medium to record a part or the whole of data and computer programs to be explained in this embodiment, and cause the storage medium drive 709 to read this storage medium, thereby installing the data and the computer programs in the information generating apparatus and the information processing apparatus. The I/F 710 is an interface for accepting inputs such as vertex indices from outside the information generating apparatus and the information processing apparatus, and outputting generated data. The I/F 710 can be an arbitrary interface such as a USB (Universal Serial Bus) or Ethernet®.

When the information generating apparatus and the information processing apparatus are turned on, the CPU 701 loads the OS from the external storage device 708 into the RAM 703 in accordance with the boot program stored in the ROM 704. This makes it possible to accept user operations by the keyboard 705 and the mouse 706, and display a GUI on the display device 707. In the information generating apparatus, when an instruction to activate a 3D model describing application is accepted by a user operation via the keyboard 705 and the mouse 706, the CPU 701 loads a corresponding program into the RAM 703 and executes the program. Likewise, in the information processing apparatus, when an instruction to activate an object rendering application is accepted by a user operation via the keyboard 705 and the mouse 706, the GPU 702 executes a three-dimensional object rendering process. Consequently, these apparatuses execute the file generation process and the three-dimensional object rendering process related to a 3D model (to be described later).

Figure 8:
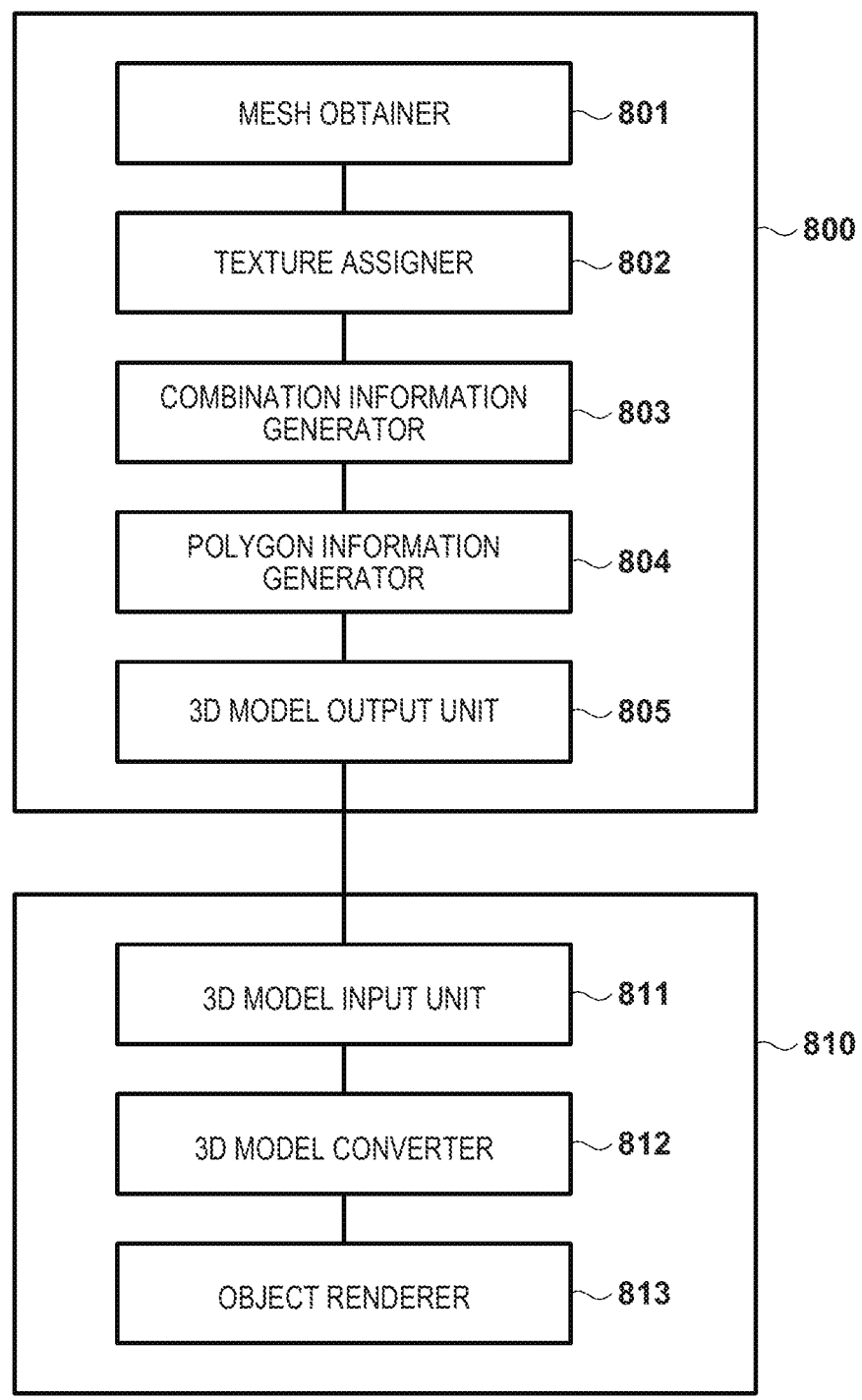
FIG. 8 is a block diagram showing functional arrangement examples of the information generating apparatus and the information processing apparatus.

Functional arrangement examples of the information generating apparatus and the information processing apparatus will be explained with reference to FIG. 8. Note that FIG. 8 shows examples of the functional arrangements of the information generating apparatus and the information processing apparatus, and a part or the whole of the functional arrangements shown in FIG. 8 can be replaced with another arrangement. For example, one functional unit can be divided into a plurality of functional units, and a plurality of functional units can be integrated into one functional unit. In an example, an information generating apparatus 800 includes a mesh obtainer 801, a texture assigner 802, a combination information generator 803, a polygon information generator 804, and a 3D model output unit 805. In another example, an information processing apparatus 810 includes a 3D model input unit 811, a 3D model converter 812, and an object renderer 813. These functional units can be implemented by, for example, the CPUs 701 of the information generating apparatus and the information processing apparatus by executing programs corresponding to a 3D model describing application and an object rendering application. However, the present disclosure is not limited to this, and it is also possible to use dedicated hardware that implements a part or the whole of the functional units shown in FIG. 8.

The mesh obtainer 801 obtains information of a mesh expressing a three-dimensional object as shown in FIG. 3A. The mesh obtainer 801 can obtain mesh information existing in a known global coordinate system and stored in the external storage device 708 beforehand, and can also obtain mesh information from a storage medium via the storage medium drive 709 or from the outside via the I/F 710. The mesh obtainer 801 outputs this mesh information to the texture assigner 802. The texture assigner 802 determines a texture vertex to be assigned to each polygon contained in the mesh, and obtains texture assignment information. The texture assigner 802 outputs the texture assignment information for each polygon to the combination information generator 803. Based on the obtained assignment information, the combination information generator 803 extracts a combination of the existing mesh vertex number and texture vertex number, and generates combination information as shown in FIG. 5A. The combination information generator 803 outputs the combination information to the polygon information generator 804. Based on the combination information, the polygon information generator 804 generates polygon information as shown in FIG. 5B. The mesh vertex information, the texture vertex information, the combination information, and the polygon information obtained/generated as described above are provided by, for example, the file format shown in FIG. 6A to the information processing apparatus 810 for rendering a three-dimensional object.

The 3D model input unit 811 accepts a file from, for example, the information generating apparatus 800, and analyzes the header of the obtained file. Then, the 3D model input unit 811 obtains a texture image based on a texture image link, obtains information of the number of combination information elements, the number of mesh vertices, the number of texture vertices, and the number of polygons, and allocates memory areas for holding the information. After that, the 3D model input unit 811 stores the combination information, mesh vertex coordinate information, texture vertex coordinate information, and the polygon information in the allocated areas. The 3D model converter 812 converts the information obtained by the 3D model input unit 811 into information of a combination of the mesh vertex coordinate and the texture vertex coordinate, and stores the information in the memory. The object renderer 813 renders a three-dimensional object based on the information stored in the memory by the 3D model converter 812. Note that this embodiment shows the above-described arrangements because many GPUs receive data in a state in which the mesh vertex coordinate and the texture vertex coordinate are paired as shown in FIGS. 4A and 4B, but a different arrangement may also be used in accordance with an actual rendering mode. For example, the 3D model converter 812 need not be used for a rendering apparatus (GPU) capable of directly rendering an object from data having a format combining FIGS. 3A and 3B and FIGS. 5A and 5B. Also, for a rendering apparatus that performs rendering by receiving data having a format not explained in this specification, the 3D model converter 812 can modify data so that the data has a format suitable for the rendering apparatus.

Procedure of Processing

An example of the procedure of a file generation process related to a 3D model, which is executed by the information generating apparatus, will be explained with reference to FIG. 9. This process is executed when, for example, an image obtained by a camera is given as a texture to a 3D model existing in a known global coordinate system, or a CG texture is given to a specified portion. In this process, the texture assigner 802 first determines a texture to be assigned to each polygon in a mesh obtained by the mesh obtainer 801 (step S901). Then, the combination information generator 803 extracts all combinations of the existing mesh vertices and texture vertices in accordance with the texture assignment performed in step S901, and generates combination information as shown in FIG. 5A (step S902). Subsequently, the polygon information generator 804 generates polygon information as shown in FIG. 5B based on combination numbers given to the combinations of the mesh vertices and the texture vertices as shown in FIG. 5A (step S903). After that, whether the processing in step S903 has been completed on all polygons is determined (step S904). If the processing of all polygons is not complete (NO in step S904), the process advances to the processing of the next polygon (step S905), and the processing in step S903 is repetitively executed until the processing of all polygons is complete (until YES in step S904). If the processing in step S903 has been completed on all polygons, the 3D model output unit 805 outputs a 3D model as a file having the format as shown in FIG. 6A, based on the obtained/generated information.

Figure 10:
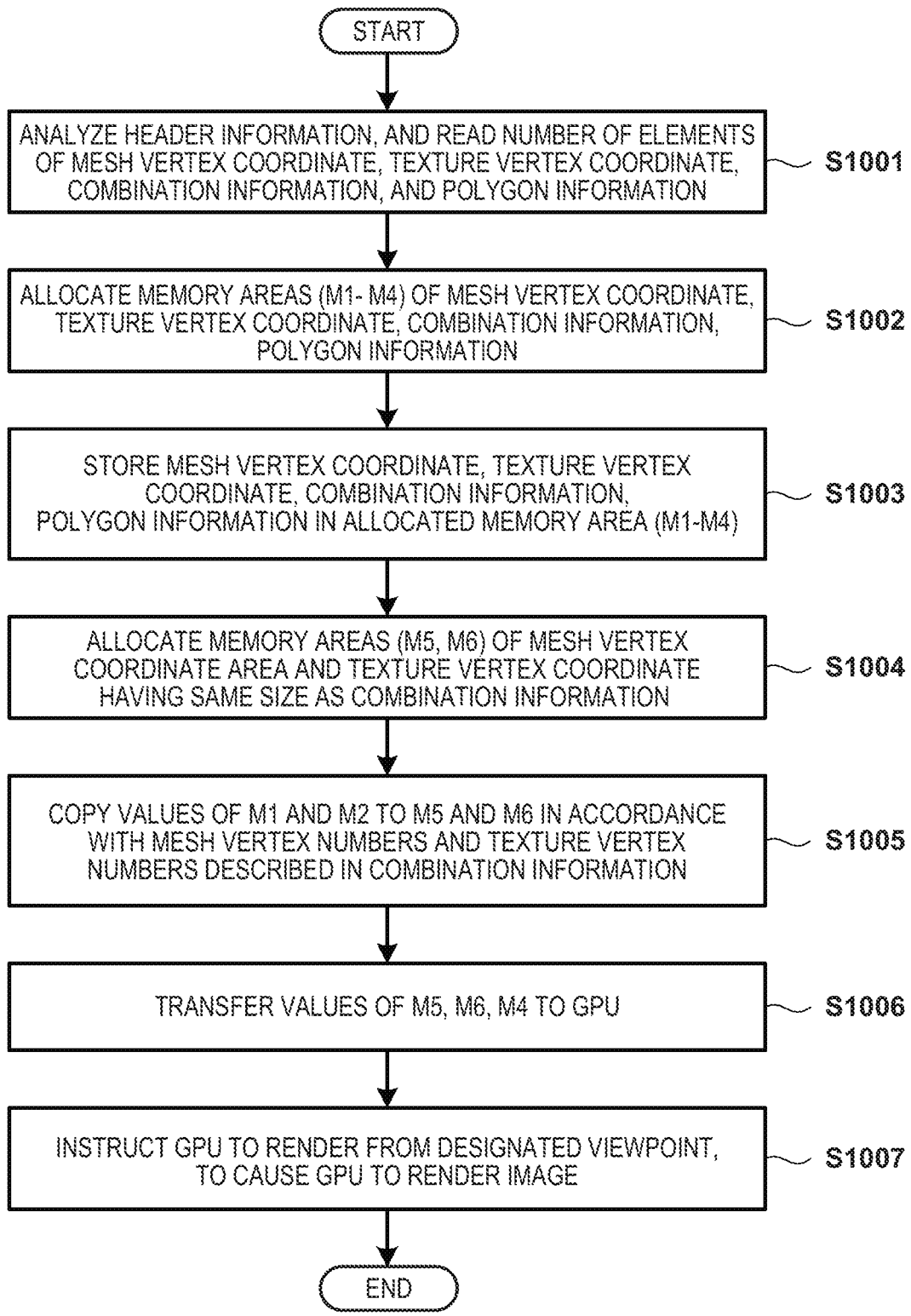
FIG. 10 is a flowchart showing an example of the procedure of processing to be executed by the information processing apparatus.

Next, an example of the procedure of a three-dimensional object rendering process to be executed by the information processing apparatus based on a file generated by the information generating apparatus will be explained with reference to FIG. 10. Note that many GPUs receive data having the format as shown in FIGS. 4A and 4B as described above, so a process in which the information processing apparatus performs rendering by loading 3D model data on a memory based on a file obtained from the information generating apparatus will be explained below. In this process, the 3D model input unit 811 first analyzes header information of the obtained file, and reads the number of elements (the size) of each of the mesh vertex coordinates, the texture vertex coordinates, the combination information, and the polygon information (step S1001). Then, the 3D model input unit 811 allocates memory areas for storing these pieces of information in accordance with the sizes obtained in step S1001 (step S1002), reads out the information from the file, and stores the readout information in the allocated memory areas (step S1003). Let M1, M2, M3, and M4 be the memory areas allocated for the mesh vertex coordinate, the texture vertex coordinate, the combination information, and the polygon information.

The 3D model converter 812 allocates, on the memory, mesh vertex coordinate area M5 and texture vertex coordinate area M6 each having a size corresponding to the size of the combination information (step S1004). For example, when the number of bits to be allocated to represent each mesh coordinate value is N1 times (N1 is, for example, 1 or more) the number of bits to be allocated to represent the value of the combination information, M5 can be allocated as an area having the number of bits that is N1 times the number of bits of M3. Similarly, when the number of bits to be allocated to represent each texture coordinate value is N2 times (N2 is, for example, 1 or more) the number of bits to be allocated to represent the value of the combination information, M6 can be allocated as an area having the number of bits that is N2 times the number of bits of M3. Then, the 3D model converter 812 copies the coordinate values stored in M1 and M2 to M5 and M6 in accordance with the mesh vertex numbers and the texture vertex numbers described in the combination information (step S1005). After that, the object renderer 813 transfers the information stored in M4 to M6 to the GPU (step S1006), and instructs the GPU to render an object by designating a required view point position, thereby causing the GPU to render an image (step S1007). Note that in the above-described example, loading of information to the memory is described in detail as an example. In practice, however, any method can be used as long as processing that makes it possible to specify a combination of the mesh vertex coordinate and the texture vertex coordinate is performed.

In this embodiment as described above, the combination information of the mesh vertex and the texture vertex is defined and used. By thus designating the mesh vertex coordinate and the texture vertex coordinate from the polygon information via the combination information, it is possible to prevent the same mesh vertex coordinate and the same texture vertex coordinate from being described a plurality of times, and reduce the redundancy of data expression. In addition, the use of the arrangements as shown in FIGS. 5A and 5B makes it possible to reduce the processing load of the process of converting data into the format suitable for rendering of a three-dimensional object as shown in FIGS. 4A and 4B.

Second Description Example of 3D Model According to Embodiment

Figure 12A:
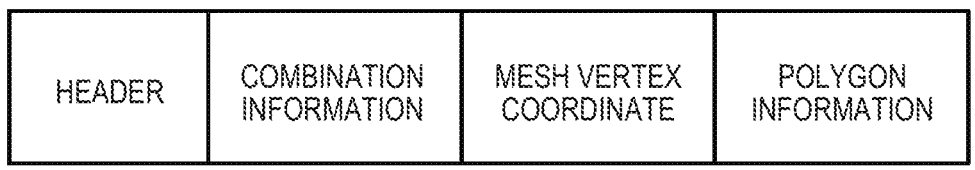
FIG. 12A is a view showing the second arrangement example of the file describing the data structure according to the embodiment.
Figure 12B:
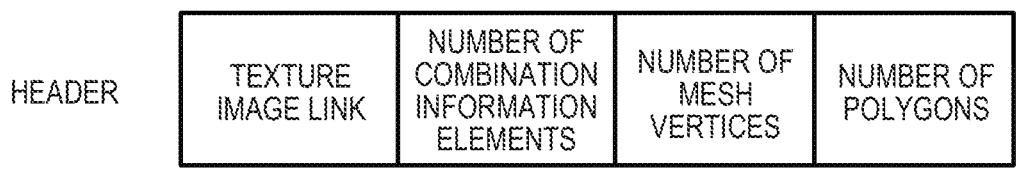
FIG. 12B is a view showing the second arrangement example of the file describing the data structure according to the embodiment.
Figure 12C:
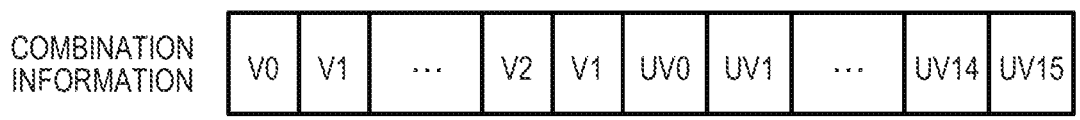
FIG. 12C is a view showing the second arrangement example of the file describing the data structure according to the embodiment.
Figure 12D:
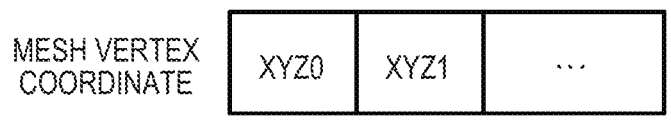
FIG. 12D is a view showing the second arrangement example of the file describing the data structure according to the embodiment.
Figure 12E:
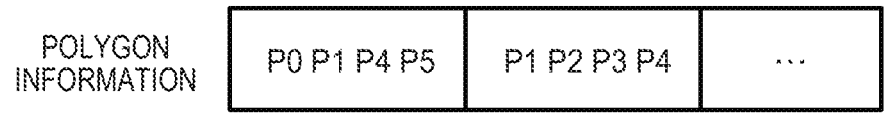
FIG. 12E is a view showing the second arrangement example of the file describing the data structure according to the embodiment.

Note that in the example shown in FIG. 1A, the texture region surrounded by C0 to C5 in FIG. 1B is assigned to two portions in the mesh, so one texture vertex is assigned to a plurality of mesh vertices. However, in a case in which repetitive pasting like this hardly occurs such as when performing texture mapping from a photographed image, a situation in which the texture vertex coordinate is repetitively described hardly occurs. In this case, as shown in FIG. 11, the information shown in FIG. 3B can be omitted by directly describing the texture vertex numbers in the combination information. FIGS. 12A to 12E show a file arrangement in this case. Compared to FIG. 6A, a texture vertex coordinate region is omitted from the arrangement shown in FIG. 12A. Also, compared to the header shown in FIG. 6B, information of the number of texture vertices is omitted from a header shown in FIG. 12B. In addition, combination information shown in FIG. 12C contains information of the texture vertex coordinates instead of the texture vertex numbers. Note that the arrangements shown in FIGS. 12D and 12E are the same as those shown in FIGS. 6D and 6F.

This makes it possible to reduce the data amount and also reduce the processing load of data loading.

Third Description Example of 3D Model According to Embodiment

In the above description example, all pieces of existing combination information are described in order to reduce the redundancy of description of the mesh vertices and the texture vertices. When loading them to a memory for rendering in this method, the mesh vertex coordinates and the texture vertex coordinates are copied one by one by referring to the mesh vertex numbers and the texture vertex numbers. On the other hand, mesh vertex numbers corresponding to, for example, combination numbers P0 to P5 shown in FIG. 5A are V0 to V5. When loading them, the load of the data loading process can be reduced if it is possible to collectively copy the values of V0 to V5 shown in FIG. 3A. Similarly, texture vertex numbers corresponding to, for example, combination numbers P0 to P11 shown in FIG. 5A are C0 to C11, so the load of the data loading process can be reduced by collectively copying the table shown in FIG. 3B when loading them. In this description example, therefore, a range within which the order of mesh vertex information and texture vertex information corresponds to the order of numbers to be described in the combination information and copying of the coordinate values can be executed at once is specified as a range that can be block-copied. In this description example, the information shown in FIG. 5A is described as shown in, for example, FIG. 13. That is, for each of the mesh vertex numbers and the texture vertex numbers of the combination information, the information generating apparatus specifies a number maintaining consecutive numbers from 0 as a block copy size, and describes information of this block copy size instead of the vertex numbers. FIGS. 14A to 14F show an example of a file to be generated by the information generating apparatus in this case. In this example, the information generating apparatus stores information of the block copy size for each of the mesh vertices and the texture vertices in the header. Accordingly, the information processing apparatus having obtained this file can collectively copy the mesh vertex coordinates and the texture vertex coordinates for P0 to P5, and the texture vertex coordinates for P6 to P11, in the combination information.

Note that the file format is not limited to this. For example, the combination information can also contain the block copy size information. That is, in the example shown in FIG. 14C, the mesh vertex numbers and the texture vertex numbers for combination information that is not a block copy target are described. However, the block copy size information may also be stored before each vertex number. Also, in this example, based on the assumption that a combination of mesh vertex number V0 and texture vertex number C0 corresponds to combination information P0, a number from P0 for which block copying is possible is defined as the block copy size, but the present disclosure is not limited to this. For example, it is also possible to specify a number that can be block-copied from an arbitrary mesh vertex number and an arbitrary texture vertex number, and describe the mesh vertex number, the texture vertex number, and the block copy size. In this case, when mesh vertex numbers "V1" to "V4" are consecutive for four pieces of combination information, "V1" from which mesh vertex numbers become consecutive and block copy size "4" can be described. This description enables, for example, block copying from an arbitrary combination number. For example, when consecutive mesh vertex numbers V3 to V8 correspond to 6 consecutive combination numbers P0 to P5 and consecutive mesh vertex numbers V2 to V5 correspond to 4 consecutive combination numbers P6 to P9, information such as "V3", "6", "V2", and "4" can be described in the combination information. This can increase opportunities capable of performing block copying on a 3D model having a large size, and reduce the processing load at the time of loading them to a memory. Note that a case in which whether block copying can be performed can be determined by determining whether the mesh vertex numbers and the texture vertex numbers are consecutive has been explained, but the present disclosure is not limited to this. That is, a size capable of collectively copying information of the mesh vertex coordinates shown in FIG. 3A or information of the texture vertex coordinates shown in FIG. 3B need only be defined as the block copy size. In this case, the mesh vertex coordinates shown in FIG. 3A or the texture vertices shown in FIG. 3B need not be arranged in the mesh vertex number order or the texture vertex number order.

Figure 9:
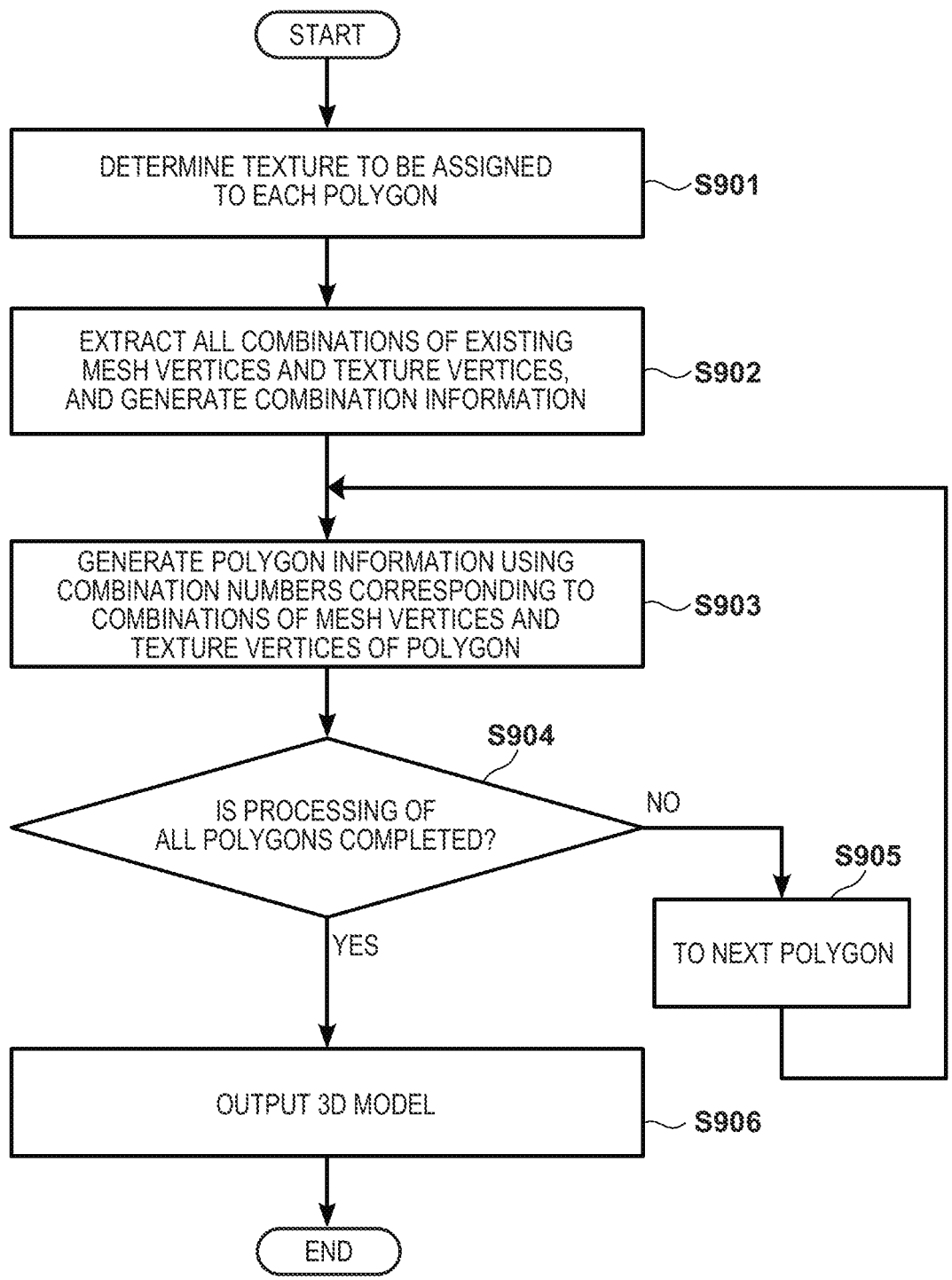
FIG. 9 is a flowchart showing an example of the procedure of processing to be executed by the information generating apparatus.

The procedure of the 3D model data generation process is similar to FIG. 9. In processing of step S906, however, for each of the mesh vertex numbers and the texture vertex numbers from combination information P0, the information generating apparatus specifies a number of consecutive numbers increasing from 0 as the block copy size. Then, the information generating apparatus describes the block copy size in the header information of the 3D model data, and describes the combination information by a format that omits the mesh vertex numbers and the texture vertex numbers as targets of block copying. Consequently, the file shown in FIGS. 14A to 14F is formed.

Figure 15:
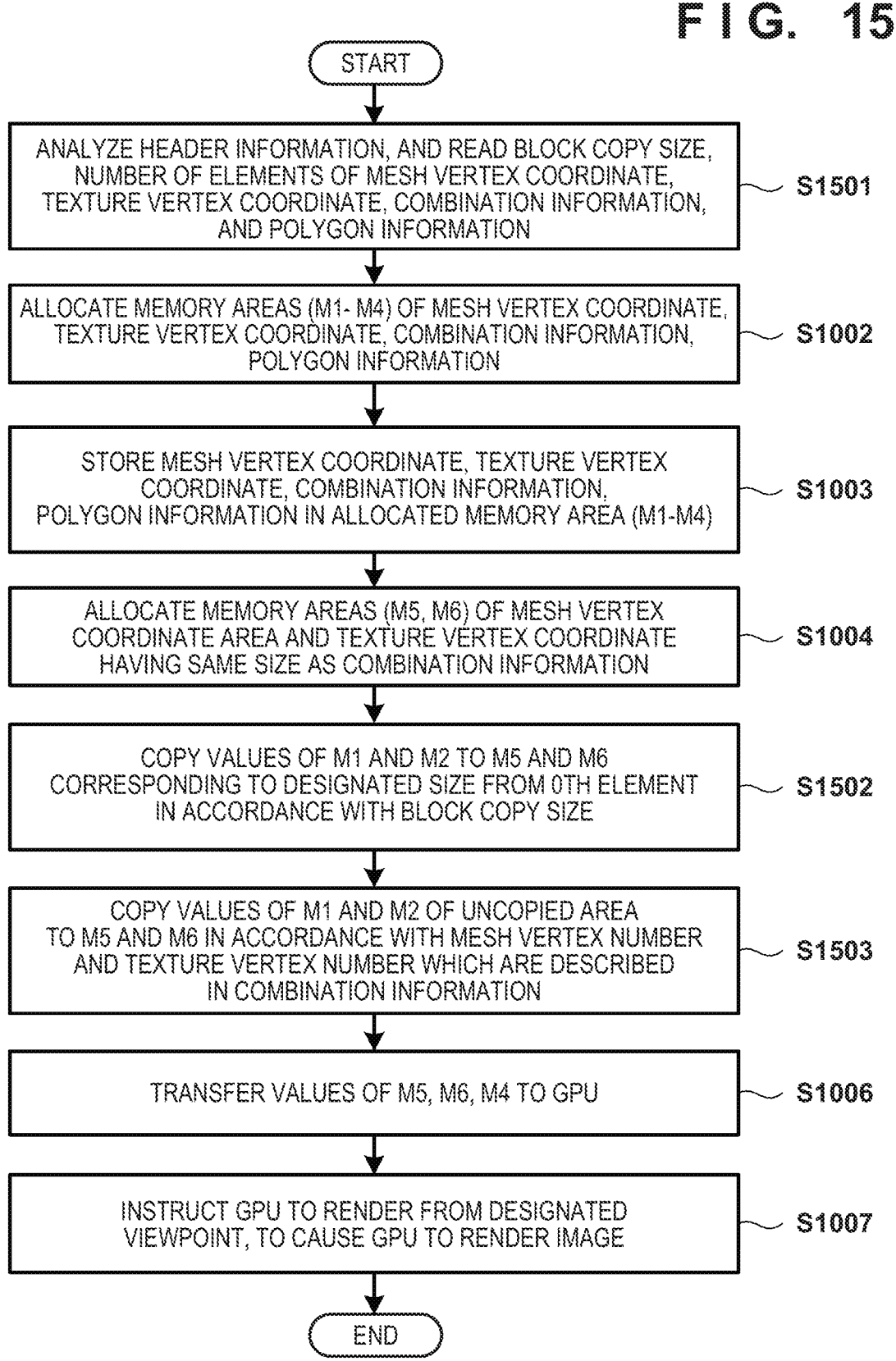
FIG. 15 is a flowchart showing an example of the procedure of processing to be executed by the information processing apparatus.

An example of the procedure of a three-dimensional object rendering process to be executed by the information processing apparatus based on the above-described file will be explained below with reference to FIG. 15. Note that in this process, an explanation of the same processing as in FIG. 10 will be omitted by using the same reference numerals as in FIG. 10. In this process, the information processing apparatus first analyzes the header information, and obtains information of the block copy sizes of the mesh vertices and the texture vertices in addition to the information read in step S1001 (step S1501). Then, after memory areas M1 to M6 are allocated and data is stored in M1 to M4 in steps S1002 to S1004, the information processing apparatus block-copies values corresponding to the specified sizes from the 0th element, in accordance with the block copy sizes (step S1502). For example, when the block copy size of the mesh vertices is 6, the information processing apparatus collectively copies the 0th to 5th elements of M1 to the 0th to 5th elements of M5. Likewise, when the block copy size of the texture vertices is 6, the information processing apparatus collectively copies the 0th to 11th elements of M2 to the 0th to 11th elements of M6. In this stage, information corresponding to blank columns in FIG. 13 is completely loaded to the memory. After that, the information processing apparatus copies the values of uncopied elements one by one by referring to the combination information in the same manner as in step S1005 (step S1503). Consequently, the same data as explained with reference to FIG. 10 is loaded in areas M5 and M6.

Note that a flag indicating which of the first to third description examples is used may also be stored in the header. This makes it possible to use a data description method appropriate for each 3D model. Furthermore, the description of the mesh vertex numbers in the second description example may also be partially omitted by additionally describing the block copy size as in the third description example. That is, these description examples can be used independently of each other, and can also be combined.

Comparison of Data Amounts

The data amounts of the conventional example (FIGS. 4A and 4B) and the first to third description examples (the combination of FIGS. 3A and 3B and FIGS. 5A and 5B, and the combination of FIGS. 3A and 3B, FIG. 13, and FIG. 5B) will be compared below. Assume that the mesh vertex coordinate and the texture vertex coordinate are described by 4-byte single-precision floating points with respect to each of the X, Y, and Z coordinates, and a number is described by a 4-byte integral number.

In the case shown in FIGS. 4A and 4B, (4 (the number of bytes)×3 (the number of dimensions of the mesh vertex)+4 (the number of bytes)×2 (the number of dimensions of the texture vertex))×18 (the number of elements)=360 bytes are necessary for the information shown in FIG. 4A. Also, 4 (the number of bytes)×4 (the number of mesh vertices)×6 (the number of elements)=96 bytes are necessary for the information shown in FIG. 4B. Accordingly, a total of 456 bytes are necessary for the information shown in FIGS. 4A and 4B.

In the first description example, 4 (the number of bytes)×3 (the number of dimensions)×8 (the number of vertices)=96 bytes are necessary or the information shown in FIG. 3A, and 4 (the number of bytes)×2 (the number of dimensions)×12 (the number of vertices)=96 bytes are necessary or the information shown in FIG. 3B. In addition, 4 (the number of bytes)×2 (the mesh vertex number and the texture vertex number)×16 (the number of elements)=128 bytes are necessary for the information shown in FIG. 5A, and 96 bytes are necessary for the information shown in FIG. 5B in the same manner as in FIG. 4B. Therefore, the first description example requires a total of 416 bytes. In the third description example, FIG. 5A is replaced with FIG. 13, so 4 (the number of bytes)×14 (the number of elements)+4 (the number of bytes)×2 (the number of elements of the block copy size)=64 bytes are necessary for the description shown in FIG. 13. Therefore, the third description example requires a total of 352 bytes.

As described above, each of the description examples of this embodiment can reduce the data size when compared to the conventional description method shown in FIGS. 4A and 4B. In addition, the use of the third description method makes it possible to largely reduce the data amount as the block copy size increases. Note that the number of bytes for expressing the coordinate information and the number is merely an example, so the number of bytes to be used to express the number can properly be varied in accordance with, for example, the number of vertices.

Note that the above-described method is applicable to an arbitrary method that uses data representing the shape of an object and data representing a texture plane that can be assigned to the surface of the shape, and expresses a three-dimensional object by associating a first point on the object shape with a second point on the texture plane. That is, the combination information is used as information for associating data of the shape of a three-dimensional object with data of a texture image, thereby preventing repetitive description of information of the same combination of the first point of the shape and the second point of the texture. The amount of data describing a three-dimensional object can be reduced by describing each face of the shape of the three-dimensional object by using the combination number.

Second Embodiment

The second embodiment of the present disclosure will be described below by mainly explaining differences from the first embodiment. In the first embodiment, the example in which a 3D model is described by using the combination information of the vertices of the shape and the texture has been explained. In this embodiment, however, an example in which a 3D model is described by using combination information of edges expressing the connection relationship between vertices will be explained.

FIGS. 16A to 16F show an example in which the model shown in FIG. 1A is described by using edge combination information. FIGS. 16A and 16C are lists of the vertex coordinates of a mesh and textures, like FIGS. 3A and 3B. FIG. 16B expresses edges each connecting two connected vertices, by using combinations of mesh vertex numbers shown in FIG. 16A. Similarly, FIG. 16D shows texture edges. FIG. 16E represents combination information of the texture edges corresponding to the mesh edges, and the mesh and the textures are associated with each other by using this information. FIG. 16F defines a face by designating edge combination information. In this expression form, it is possible to first access combination information by using polygon information, access the edges of the mesh and the textures by using this combination information, access the vertex coordinates from the edge information, and finally obtain coordinate information defining a face.

Figure 17:
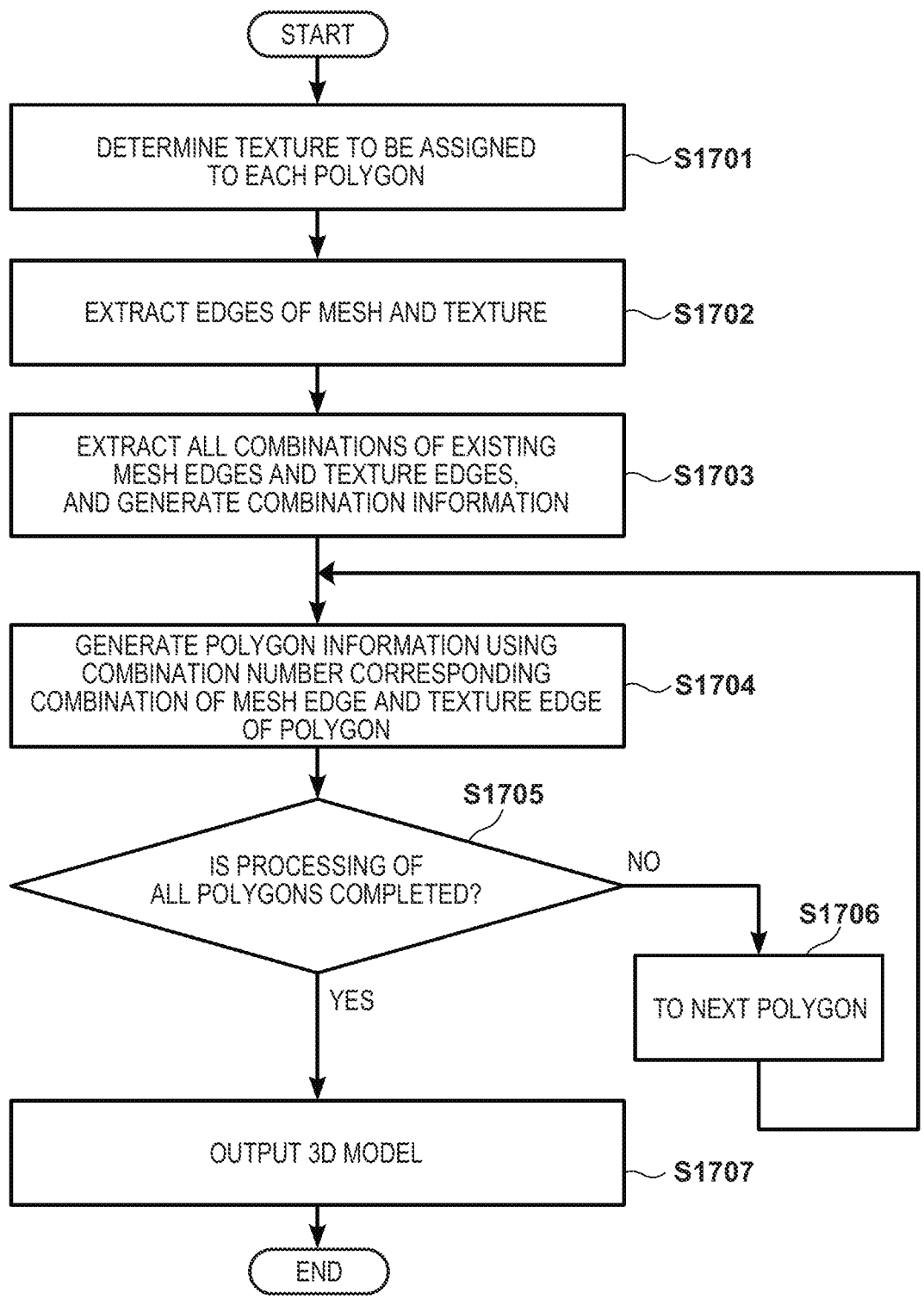
FIG. 17 is a flowchart showing an example of the procedure of processing to be executed by the information generating apparatus.

FIG. 17 shows an example of the procedure of a process of generating the data format shown in FIGS. 16A to 16F. This process corresponds to FIG. 9 of the first embodiment, and constituent parts for executing the process are the same as those shown in FIG. 8. In this process, a texture to be assigned to each polygon in a mesh obtained by a mesh obtainer 801 is first determined (step S1701), and the edges of the mesh and the textures are extracted (step S1702). Then, all combinations of the mesh edges and the texture edges extracted in step S1702 are extracted in accordance with the texture assignment performed in step S1701, thereby generating combination information as shown in FIG. 16E (step S1703). Subsequently, polygon information as shown in FIG. 16F is generated based on combination numbers given to combinations of the mesh edges and the texture edges as shown in FIG. 16E (step S1704). After that, whether the processing of step S1704 is completely performed on all polygons is determined (step S1705). If the processing of all polygons is not complete (NO in step S1705), the process proceeds to the processing of the next polygon (step S1706), and the processing in step S1704 is repetitively executed until the processing of all polygons is complete (until YES in step S1705). If the processing of step S1704 is completely performed on all polygons, a 3D model is output based on the obtained/generated information.

As described above, the constituent elements of the shape data and the texture data can be either the vertices or the edges (sides). In either case, a 3D model contains first information describing first constituent elements of the shape data, and further contains second information describing combinations of the first constituent elements and second constituent elements of textures, which are assigned in association with the first constituent elements. In addition, a 3D model contains third information describing the shape of a face of a three-dimensional object and a texture to be assigned, in accordance with a value indicating the combination of the first constituent element and the second constituent element. Furthermore, a 3D model can contain fourth information describing the second constituent elements contained in the texture data.

Note that based on the same concept as above, the combination information may also be expressed as combinations of faces by independently generating polygon information for a mesh and textures. That is, it is also possible to independently form a mesh vertex number list and a texture vertex number list each corresponding to the polygon numbers shown in FIG. 3C, and generate combination information by using combinations of mesh polygon numbers and texture polygon information.

The correspondence between the edges of a mesh and textures can be embedded in data by using the expression form as described above. Consequently, when it is necessary to process a model while holding the edge correspondence between the textures and the mesh, the process can be executed at high speed without analyzing any edge from face connection information.

According to the present disclosure, it is possible to efficiently express a three-dimensional object.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An information generating apparatus comprising:
one or more processors; and
one or more memories that store computer-readable instructions for causing, when executed by the one or more processors, the information generating apparatus to:
generate three-dimensional (3D) model information for specifying a 3D object by using shape data indicating a shape of the 3D object and texture data indicating a texture to be assigned to a surface of the shape data, wherein the 3D model information comprises:
first information including first information elements, each first information element being information for specifying at least one of a vertex or an edge forming the shape data and corresponding to different one of vertices forming the shape data or corresponding to different one of edges forming the shape data;
second information for specifying combinations of the first information elements and second information elements for specifying constituent elements included in the texture data, one of the second information elements being in association with one of the first information elements; and
third information for specifying surfaces forming the shape data, one of the surfaces forming the shape data being represented by using some of the combinations specified by the second information; and
output the 3D model information.

2. The information generating apparatus according to claim 1, wherein, in a case where a first information element of the first information elements corresponds to a vertex of the vertices forming the shape data, a constituent element of the constituent elements included in the texture data is a vertex of the texture data.

3. The information generating apparatus according to claim 2, wherein a second information element of the second information elements is represented by a coordinate value of the texture data.

4. The information generating apparatus according to claim 1, wherein, in a case where a first information element of the first information elements corresponds to an edge of the edges forming the shape data, a constituent element of the constituent elements included in the texture data is an edge of the texture data.

5. The information generating apparatus according to claim 1,
wherein a second information element of the second information elements is represented by using a value different from coordinates of a vertex of the texture data, and
wherein the 3D model information further comprises fourth information including the second information elements.

6. The information generating apparatus according to claim 5, wherein, in a case where an order of description of the second information elements in the fourth information corresponds to an order of values for referring to the fourth information in a plurality of combinations to be consecutively described in the second information, the information generating apparatus generates the 3D model information such that the 3D model information includes fifth information related to a range within which the orders correspond to each other, and the second information is described by omitting the second information element about a combination of the plurality of combinations, which is related to the range within which the orders correspond to each other.

7. The information generating apparatus according to claim 1, wherein, in a case where an order of description of the first information elements in the first information corresponds to an order of values for referring to the first information in a plurality of combinations to be consecutively described in the second information, the information generating apparatus generates the 3D model information such that the 3D model information includes sixth information related to a range within which the orders correspond to each other, and the second information is described by omitting a first information element about a combination of the plurality of combinations, which is related to the range within which the orders correspond to each other.

8. An information processing apparatus comprising:
one or more processors; and
one or more memories that stores a computer-readable instruction for causing, when executed by the one or more processors, the information processing apparatus to:
obtain three-dimensional (3D) model information for specifying a 3D object by using shape data indicating a shape of the 3D object and texture data indicating a texture to be assigned to a surface of the shape data, wherein the 3D model information comprises:
first information including first information elements, each first information element being information for specifying at least one of a vertex or an edge forming the shape data and corresponding to different one of vertices forming the shape data or corresponding to different one of edges forming the shape data;
second information for specifying combinations of the first information elements and second information elements for specifying constituent elements included in the texture data, one of the second information elements being in association with one of the first information elements, each combination being represented by using a value different from coordinates of the vertices forming the shape data; and
third information for specifying surfaces forming the shape data, one of the surfaces forming the shape data being represented by using some of the combinations specified by the second information; and
generate a 3D model of the 3D object based on the 3D model information.

9. The information processing apparatus according to claim 8,
wherein a second information element of the second information elements is represented by using a value different from coordinates of a vertex of the texture data, and
wherein the 3D model information further comprises fourth information including the second information elements.

10. The information processing apparatus according to claim 9, wherein, in a case where an order of description of the second information elements in the fourth information corresponds to an order of values for referring to the fourth information in a plurality of combinations to be consecutively described in the second information, the 3D model information includes fifth information related to a range within which the orders correspond to each other, and the second information obtained by omitting the second information element about a combination of the plurality of combinations, which is related to the range within which the orders correspond to each other.

11. The information processing apparatus according to claim 8, wherein a second information element of the second information elements is represented by a coordinate value of the texture data.

12. The information processing apparatus according to claim 8, wherein
in a case where an order of description of the first information elements in the first information corresponds to an order of values for referring to the first information in a plurality of combinations to be consecutively described in the second information, the 3D model information includes sixth information related to a range within which the orders correspond to each other, and the second information obtained by omitting a first information element about a combination of the plurality of combinations, which is related to the range within which the orders correspond to each other.

13. The information processing apparatus according to claim 8, wherein, in a case where a first information element of the first information elements corresponds to a vertex of the vertices forming the shape data, a constituent element of the constituent elements included in the texture data is a vertex of the texture data.

14. The information processing apparatus according to claim 8, wherein, in a case where a first information element of the first information elements corresponds to an edge of the edges forming the shape data, a constituent element of the constituent elements included in the texture data is an edge of the texture data.

15. A control method of an information generating apparatus, the method comprising:
generating three-dimensional (3D) model information for specifying a 3D object by using shape data indicating a shape of the 3D object and texture data indicating a texture to be assigned to a surface of the shape data, wherein the 3D model information comprises:
first information including first information elements, each first information element being information for specifying at least one of a vertex or an edge forming the shape data and corresponding to different one of vertices forming the shape data or corresponding to different one of edges forming the shape data;
second information for specifying combinations of the first information elements and second information elements for specifying constituent elements included in the texture data, one of the second information elements being in association with one of the first information elements; and
third information for specifying surfaces forming the shape data, one of the surfaces forming the shape data being represented by using some of the combinations specified by the second information; and
outputting the 3D model information.

16. A control method of an information processing apparatus, the method comprising:
obtaining three-dimensional (3D) model information for specifying a 3D object by using shape data indicating a shape of the 3D object and texture data indicating a texture to be assigned to a surface of the shape data, wherein the 3D model information comprises:
first information including first information elements, each first information element being information for specifying at least one of a vertex or an edge forming the shape data and corresponding to different one of vertices forming the shape data or corresponding to different one of edges forming the shape data;
second information for specifying combinations of the first information elements and second information elements for specifying constituent elements included in the texture data, one of the second information elements being in association with one of the first information elements, each combination being represented by using a value different from coordinates of the vertices forming the shape data; and third information for specifying surfaces forming the shape data, one of the surfaces forming the shape data being represented by using some of the combinations specified by the second information; and generating a 3D model of the 3D object based on the 3D model information.

17. A non-transitory computer-readable storage medium that stores a program for causing, when executed by a computer included in an information generating apparatus, the information generating apparatus to:

generate three-dimensional (3D) model information for specifying a 3D object by using shape data indicating a shape of the 3D object and texture data indicating a texture to be assigned to a surface of the shape data, wherein the 3D model information comprises:

first information including first information elements, each first information element being information for specifying at least one of a vertex or an edge forming the shape data and corresponding to different one of vertices forming the shape data or corresponding to different one of edges forming the shape data;

second information for specifying combinations of the first information elements and second information elements for specifying constituent elements included in the texture data, one of the second information elements being in association with one of the first information elements; and third information for specifying surfaces forming the shape data, one of the surfaces forming the shape data being represented by using some of the combinations specified by the second information; and output the 3D model information.

18. A non-transitory computer-readable storage medium that stores a program for causing, when executed by a computer included in an information processing apparatus, the information processing apparatus to:

obtain three-dimensional (3D) model information for specifying a 3D object by using shape data indicating a shape of the 3D object and texture data indicating a texture to be assigned to a surface of the shape data, wherein the 3D model information comprises:

first information including first information elements, each first information element being information for specifying at least one of a vertex or an edge forming the shape data and corresponding to different one of vertices forming the shape data or corresponding to different one of edges forming the shape data;

second information for specifying combinations of the first information elements and second information elements for specifying constituent elements included in the texture data, one of the second information elements being in association with one of the first information elements, each combination being represented by using a value different from coordinates of the vertices forming the shape data; and third information for specifying surfaces forming the shape data, one of the surfaces forming the shape data being represented by using some of the combinations specified by the second information; and generate a 3D model of the 3D object based on the 3D model information.

* * * * *